United States Patent [19]

Burnell et al.

[11] 3,915,188

[45] Oct. 28, 1975

[54] LOW PRESSURE DROP FUEL DISTRIBUTION VALVE

[75] Inventors: Dennis G. A. Burnell, Winsted; Albert H. White, Wethersfield, both of Conn.

[73] Assignee: Chandler Evans Inc., West Hartford, Conn.

[22] Filed: Oct. 10, 1974

[21] Appl. No.: 513,642

[52] U.S. Cl. ............ 137/118; 60/39.14; 60/39.28 R; 137/503; 431/62; 431/90
[51] Int. Cl.² ...................... G05D 11/00; F02C 7/26
[58] Field of Search ..................... 137/118, 500–501, 137/502–503; 251/206; 60/39.14, 39.28 R; 431/62, 90

[56] References Cited
UNITED STATES PATENTS

| | | | |
|---|---|---|---|
| 1,527,927 | 2/1925 | Schröder | 251/206 |
| 2,214,272 | 9/1940 | Dillman | 137/118 |
| 2,661,757 | 12/1953 | Lines | 137/118 |
| 2,701,609 | 2/1955 | Thorpe et al. | 137/118 |
| 3,620,249 | 11/1971 | Simmons | 137/503 |

Primary Examiner—William R. Cline
Assistant Examiner—H. Jay Spiegel
Attorney, Agent, or Firm—Radford W. Luther; Richard A. Dornon

[57] ABSTRACT

A fuel supply system for a gas turbine engine includes a fuel control for delivering a metered flow of fuel and a fuel distribution valve for receiving the metered flow and apportioning the metered flow among the various nozzles of the burner system. The fuel distribution valve has a first sliding plate valve for controlling flow to the primary burner and a second sliding plate valve for controlling flow to the secondary burners. A differential pressure sensor, which is subjected to the outlet pressure of the fuel control, and the pressure in the primary burner is adapted to rotate both the first and second plate valves in unison as the sensed differential pressure increases so as to provide increasing orifice areas which yield a lower pressure drop for an increased flow rate than would a fixed orifice. A staging valve is incorporated in the distribution valve to maintain the second plate valve in a closed position during engine starting.

5 Claims, 8 Drawing Figures

LOW PRESSURE DROP FUEL DISTRIBUTION VALVE

BACKGROUND OF THE INVENTION

This invention relates to fuel supply systems for gas turbine engines and more particularly to the fuel distribution valves incorporated therein.

Existing fuel distribution valves engender relatively high pressure drops thereacross (300–500 psi). Because of this fact, a high pressure fuel pump is required to supply fuel to even a low pressure burner system. The most prevalent form of valve currently utilized in fuel distribution valves is the well-known poppet valve which not only occasions a large pressure drop, but is also susceptible to having its performance impaired by contaminants in the fuel because of its small stroke.

SUMMARY OF THE INVENTION

The invention provides a fuel distribution valve construction which avoids undue pressure drops and is contaminant resistant. In addition, a valve of the invention is capable of furnishing fuel to a plurality of burners in such a manner as to accommodate their respective nozzle characteristics.

A fuel supply system of the invention has a fuel control for delivering a metered flow of fuel and a fuel distribution valve for receiving the metered flow and delivering it to the burner system of a gas turbine engine. The fuel distribution valve incorporates at least one sliding plate valve adapted to present a variable area orifice to the metered flow for producing a slight pressure drop prior to delivery to a burner system. The position of the sliding plate valve, and hence the effective area of the orifice, is determined by the pressure differential between the outlet pressure of the fuel control and the pressure downstream of the orifice. To this end, a differential pressure sensor is connected to the sliding plate valve such that an increase in the aforementioned pressure differential positions the valve to increase the effective area of the orifice. In this manner, the pressure drop will not increase inordinately with higher flow rates. Also, since sliding plate valves exhibit superior resistance to contaminants, a valve of the invention is particularly well suited to handling contaminated fuel.

It should be noted that a valve of the invention may embody any number of sliding plates, with each plate containing one or more orifices. For example, in the illustrated embodiment, a first plate, having only one orifice therein, controls fuel flow to a primary burner; whereas a second plate, having a plurality of orifices therein, controls fuel flow to a plurality of secondary burners. In such an arrangement the size and geometry of the orifices, as well as their placement on the sliding plate, dictates the division of metered flow among the burners for a given valve position. The invention may also include a means to separately operate the plates, if mandated by the requirements of the burner system to which the invention is applied.

It is therefore a primary object of the invention to provide a fuel distribution valve which does not occasion an excessive pressure drop.

Another object is to provide a fuel distribution valve which is contaminant resistant.

A further object is to provide a fuel distribution valve incorporating a sliding plate and a means to increase the effective orifice area of the valve as the pressure drop thereacross increases.

These and other objects and advantages of the invention will become more readily apparent from the following detailed description, when taken in conjunction with the accompanying drawings, wherein:

DETAILED DESCRIPTION OF PREFERRED EMBODIMENT

Figure 1:
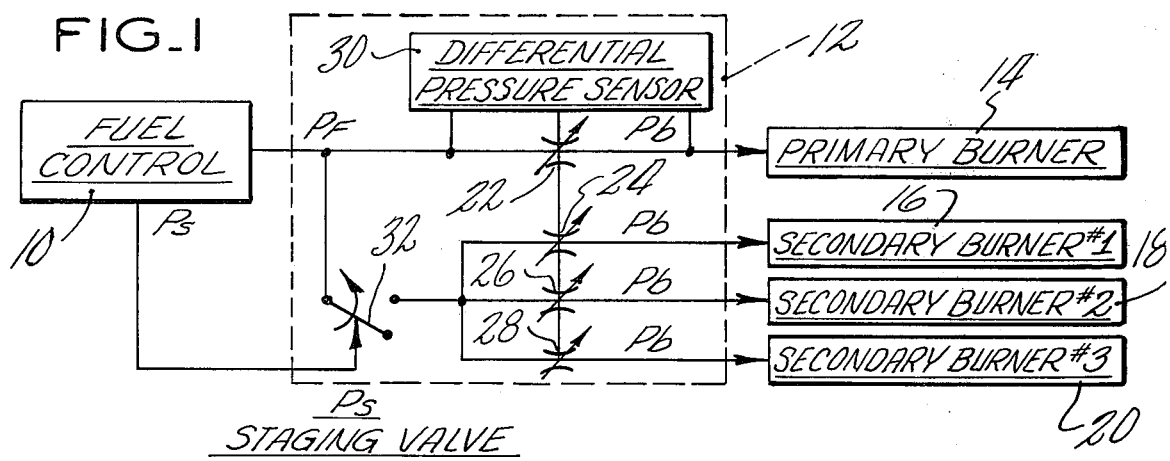
FIG. 1 is a schematic diagram of a fuel supply system of the invention.

Referring to FIG. 1, there is shown a schematic diagram of a fuel supply system according to the invention. A fuel control 10 delivers a metered flow (at pressure $P_F$) to a fuel distribution or divider valve 12, encompassed by a dashed line. The fuel distribution valve 12, in turn, allocates the fuel it receives between a primary burner 14 and three secondary burners 16, 18 and 20 of a gas turbine engine in predetermined proportions. The fuel distribution valve 12 includes four variable area orifices or variable resistances 22, 24, 26 and 28 in parallel flow relationship. The pressure downstream of the orifice 22, which supplies the primary burner, is denoted $P_b$. It should be noted that in a low pressure burner system, the pressure $P_b$ would approximately equal the burner pressure and would also exist downstream of the secondary orifices since the pressure drop across the fuel nozzles would be negligible. A differential pressure sensor 30 compares the pressure $P_F$ with the pressure $P_b$ and is operatively connected to the variable area orifices for simultaneously increasing their respective areas in any prescheduled manner as the pressure differential $P_F-P_b$ increases and decreasing their respective areas as the differential pressure $P_F-P_b$ decreases. During starting, the engine is supplied with fuel only through the primary burner 14. When starting is completed, fuel control 10 directs a pressure signal $P_S$ to a staging valve 32 to fluidly connect the inlet of the valve 12 to the secondary orifices 24, 26 and 28 such that all the orifices are in parallel flow relationship. During normal operation, as metered flow from the fuel control increases, the differential pressure $P_F-P_b$ increases, thereby increasing the respective orifice areas. For the special case where the orifice areas vary linearly with $P_F-P_b$, the fuel flow differential pressure relationship may be expressed as follows:

$$W_f^2 = K (\Delta P)^3$$

wherein:
  $W_f$ is fuel flow;
  $\Delta P$ is $P_F-P_b$; and $K$ is a constant

Hence, for this special case, a curve of fuel flow vs. $P_F-P_b$ resembles Neil's parabola.

Figure 2:
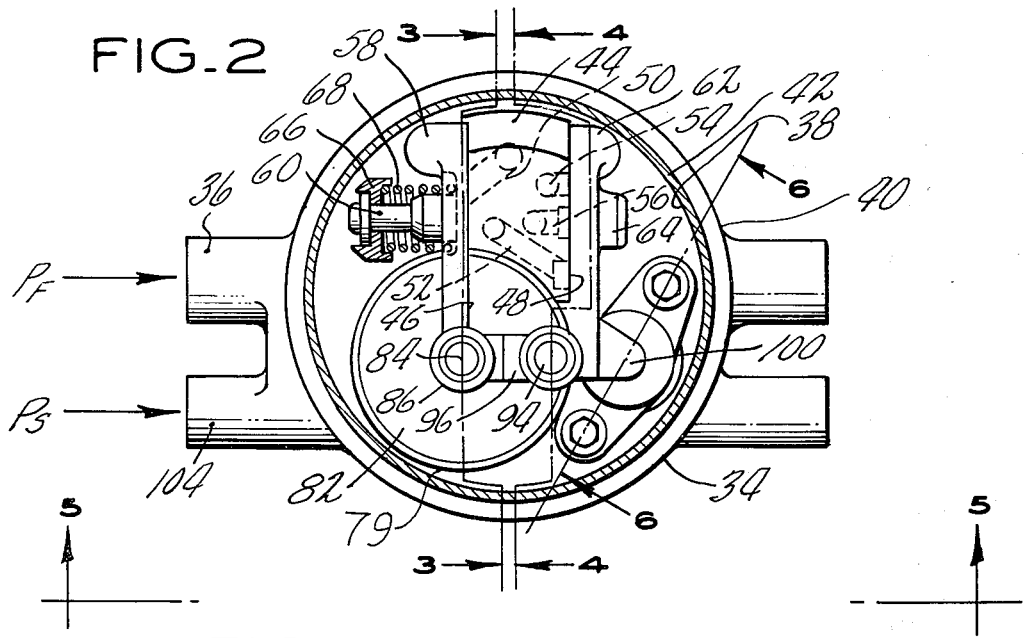
FIG. 2 is a top plan view of a preferred fuel distribution valve of the invention.
Figure 3:
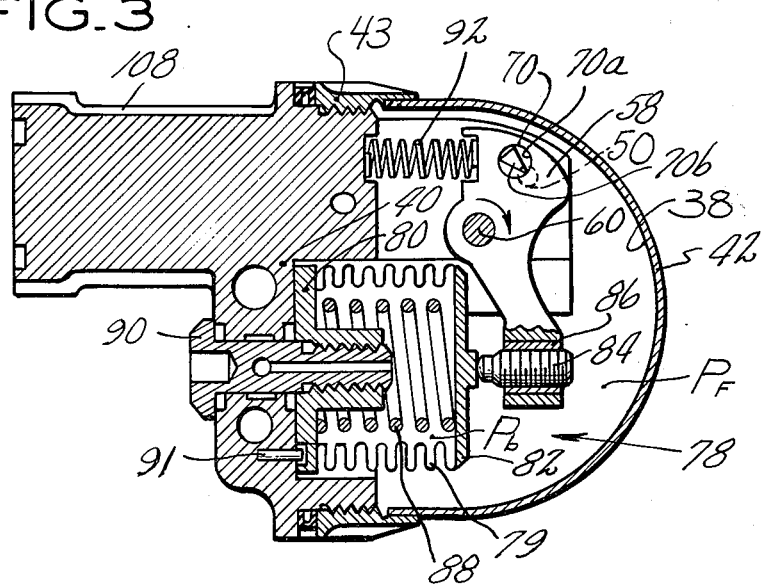
FIGS. 3 and 4 are sectional views of the fuel distribution valve, taken along the lines 3—3 and 4—4, respectively, of FIG. 2.
Figure 4:
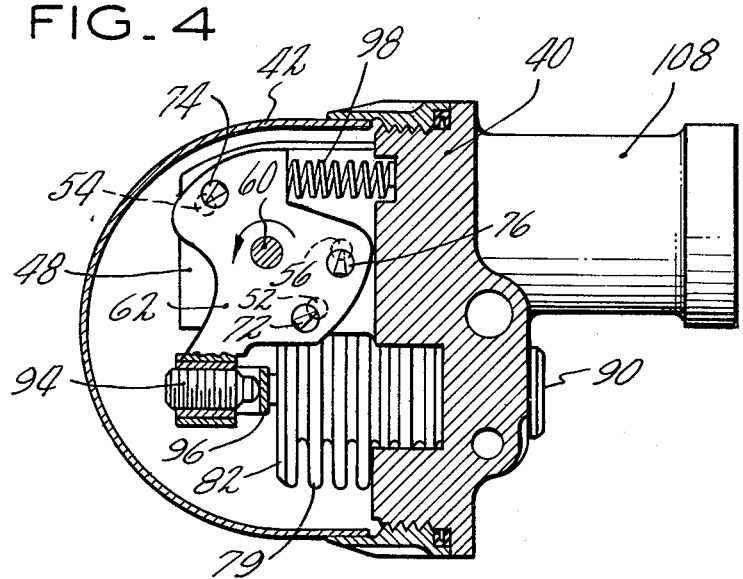

Referring to FIG. 2, there is shown a preferred form of a valve according to the invention. A housing 34 includes an inlet conduit 36 for receiving metered flow and delivering it to a cavity 38, in which the major components of the valve 12 are located. The housing 34 is constituted by a base 40 and a dome-shaped cover 42 (FIGS. 3, 4 and 5), welded to a flange 43, which, in turn, is threadably secured to the base 40. The base 40 has abutment 44 projecting therefrom into the cavity 38 and defining two flat surfaces 46 and 48 on either side thereof. As shown in FIGS. 2-4, the abutment 44 includes a primary outlet conduit 50, a first secondary outlet conduit 52, a second secondary outlet conduit 54 and a third secondary outlet conduit 56, the flat surfaces 46 and 48 surrounding and being flush with the various inlets to the outlet conduits.

A first plate 58 is mounted for rotation upon a pin 60 which extends through the abutment 44 and additionally supports a second plate 62 for rotation. The right end of the pin 60 comprises a flange 64, and the left end of the pin 60 has a spring retainer 66 threaded thereupon. A compression spring 68 is interposed between the retainer 66 and the first plate 58 to urge the inboard flat surfaces of the plates 58 and 62 into sliding engagement with the respective flat surfaces 46 and 48 of the abutment 44.

As best shown in FIG. 3, the first plate has opening 70 extending therethrough, formed by an outer cylindrical portion 70a and an inner triangular opening 70b which is adapted to register with the inlet to the outlet conduit 50. The second plate 62 incorporates similar openings 72, 74 and 76 which are adapted to respectively register with the inlets to the secondary outlet conduits 52, 54 and 56, as shown in FIG. 4. Since the plates are urged against the sides of the abutment, the only way for the fuel in the cavity to reach the outlet conduits is via the openings in the plates. When the plates are rotated in a first direction (indicated by the arrows in FIGS. 3 and 4), the respective inlet areas to the outlet conduits increase in proportion to the angular displacement of the plates. Conversely, when the plates are rotated in a second direction opposite to that of the first direction, the effective inlet areas decrease in a proportional manner.

The angular position of the first plate 58 is controlled by a bellows assembly, generally shown at 78 in FIG. 3. The bellows assembly comprises a bellows 79, a lower base 80 and an upper platform 82, upon which rests an adjustable set screw 84, the set screw controlling the preload in spring 88. Screw 84 is received in a helical locking insert 86 in the end of the plate 58. A low rate compression spring 88 extends between the base 80 and the platform 82 to bias the platform in an upward direction. A clamping screw 90 is provided for urging the base 80 into engagement with the housing 40. A headless pin 91 is received within aligned bores in the housing 34 and the base 80 to prevent turning of the base 80. The interior of the bellows assembly is exposed to a pressure $P_b$ downstream of the inlet to the outlet conduit 50, which, for a low pressure burner system, would approximately equal the burner pressure. The upper platform 82 is, of course, exposed to the pressure $P_F$ in the cavity 38. As the fuel flow from the fuel control increases, the differential pressure $P_F-P_b$ will accordingly increase, thereby compressing the bellows 79. The set screw 84 is maintained in constant engagement with the platform 82 by means of a compression spring 92 which extends between the base 40 and the plate 58. The amount of differential pressure variation necessary to effect a given change in the angular position of the plate 58 is dependent upon the rates of springs 88 and 92 and the spring rate of the bellows 79 and also that of another spring, as is discussed hereinafter.

Figure 5:
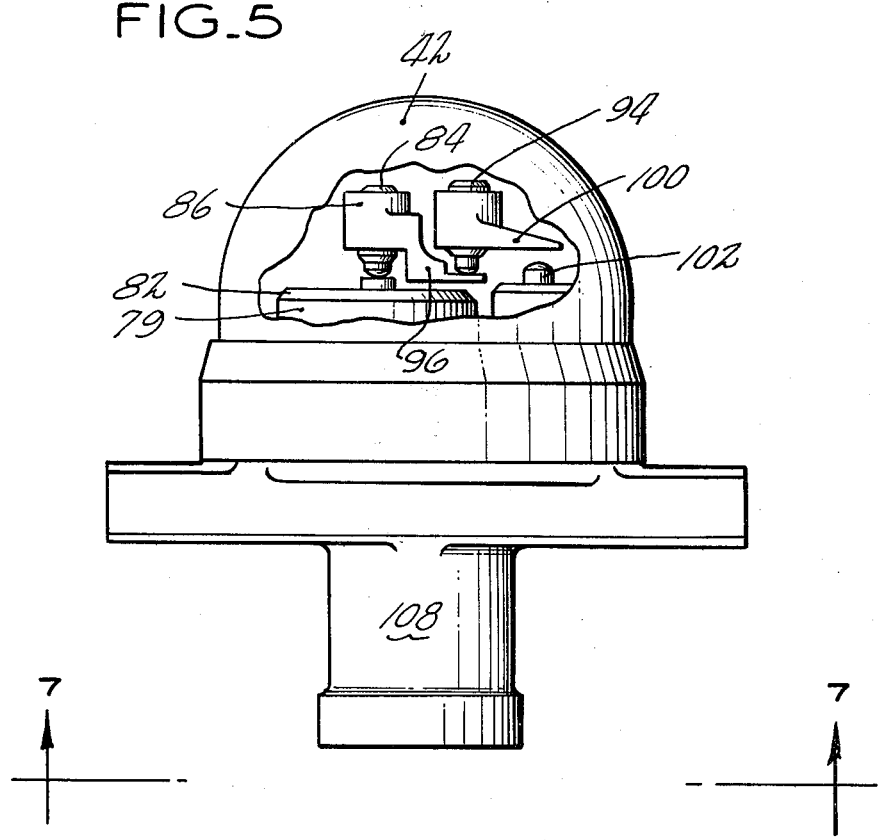
FIG. 5 is a front elevational view of the fuel distribution valve, with its cover partially broken away, as taken along the line 5—5 of FIG. 2.
Figure 6:
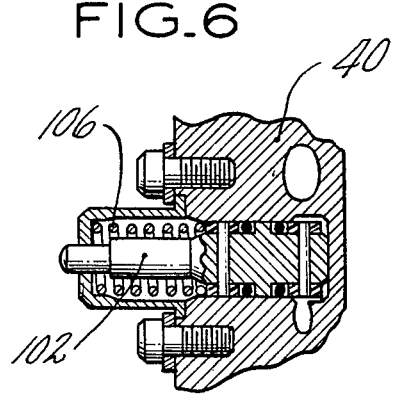
FIG. 6 is a sectional view of the staging valve taken along the line 6—6 of FIG. 2.
Figure 7:
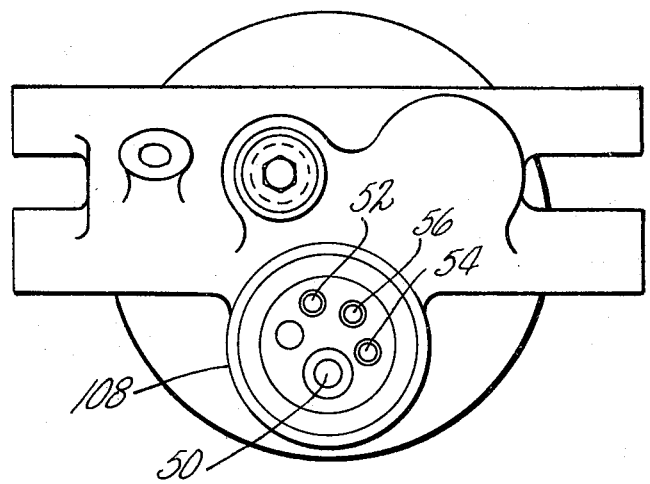
FIG. 7 is a bottom plan view of the fuel distribution valve, taken along the line 7—7 of FIG. 5.

Turning now to FIGS. 4 and 5, the arrangement by which the second plate 62 is rotated is therein illustrated. The plate 62 incorporates a set screw 94 in the manner of plate 58. However, set screw 94 does not rest on the platform 82 of the bellows assembly, but instead rests upon a projection 96 of the plate 58 so that the relative angular position of the plate 62 with respect to plate 58 may be adjusted. A compression spring 98, disposed between the base 40 and the plate 62, normally functions to maintain constant engagement between the set screw 94 and the projection 96. Viewing FIGS. 2-6 in concert, it will be seen that the second plate 62 also comprises a projection 100 adapted to be contacted by the end of a staging valve 102 during a period of engine operation when flow is not required to be delivered to the secondary burners, such as engine starting.

Upon a pressure signal $P_S$ from the fuel control 10 to the staging valve 102 via an inlet conduit 104, the valve 102 moves upward to thereby rotate the second plate 62 in the second direction and close the inlets to the secondary outlet conduits. When secondary burner operation is required, the fuel control 10 ports boost pressure to the staging valve 102, thereby to allow a spring 106 to return the staging valve 102 to its original position. Obviously, when the staging valve 102 rotates the second plate 62, the set screw 94 is lifted off of the projection 96; and, therefore, subsequent rotation of the first plate 58 will not produce a corresponding rotation of the plate 62 in contrast to the simultaneous movement during normal operation.

FIGS. 3-5 and 7 show that the base 40 of the distribution valve 12 is furnished with a cylindrical tube 108. It is through this tube that the primary outlet conduit 50 and the secondary outlet conduits 52, 54 and 56 emerge.

Contamination resistance is an inherent characteristic of a rotating plate type valve. Utilization of this form of valve, in combination with the maintenance of a minimum pressure drop which permits maximum flow areas, further enhances the contamination resistance. In addition, the sliding surfaces of the rotating plates and the abutment may be lapped to a high degree of flatness and surface finish, whereby dirt will be prevented from entering during valve operation. It should also be noted that contaminants in the fuel will not impair the proper functioning of the bellows assembly.

Figure 8:
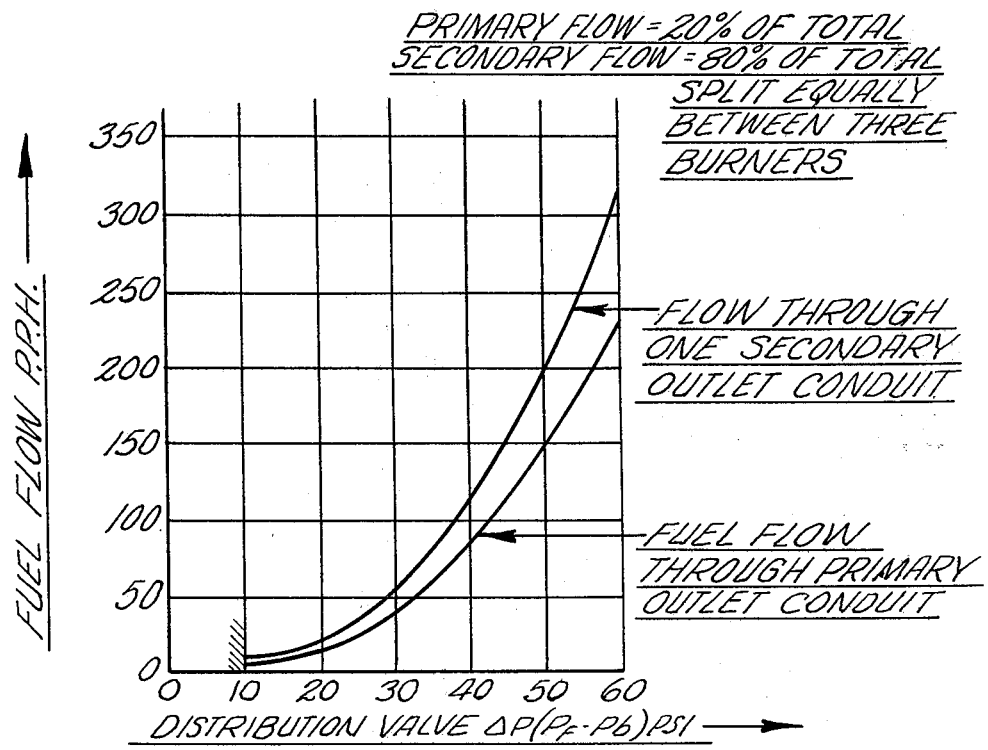
FIG. 8 is a graph showing a typical relationship between fuel flow and the pressure drop.

Operation of the illustrated fuel distribution valve can be best appreciated by reference to FIG. 8. Assuming, for the sake of illustration that, except during starting, the primary flow is to be twenty percent of the metered flow from fuel control 10 and that the secondary flow, split evenly between the secondary outlet conduits, is to constitute 80% of the total flow, the graph shows the respective relationships between flow through the primary outlet conduit and flow through one secondary outlet conduit and the pressure differential $P_F-P_b$. It will be noted that as fuel flow increases, the pressure differential $P_F-P_b$ accordingly increases, thereby enlarging the inlet areas to the various outlet conduits. In the specific example of FIG. 8, it will be seen that a three hundred pound per hour change in fuel flow through a secondary orifice occasions only about a fifty pound per square inch variation in the differential pressure ($P_F-P_b$). Also, the pressure drop across the primary orifice for a large change in fuel flow is similarly small.

Obviously, many modifications and variations are possible in light of the above teachings without departing from the scope and spirit of the invention as defined in the claims. For example, a single plate could be utilized if it incorporated both the primary and secondary orifices. Furthermore, the invention encompasses a construction having a single plate. In additin, if mandated by the application, a valve of the invention could be designed to produce a substantially constant pressure drop throughout the flow range as will be appreciated by those skilled in the art.

What is claimed is:

1. In a fuel supply system for a gas turbine engine having a burner system, the combination of a fuel control for delivering a metered flow of fuel and a fuel valve fluidly connected to the fuel control for receiving the metered flow and delivering the metered flow to the burner system, the valve comprising:

a housing having an inlet conduit for receiving the metered flow, a cavity therein in fluid communication with the inlet conduit, a first outlet conduit in fluid communication with the cavity for delivering fuel to the burner system, the wall of the cavity defining a first flat surface surrounding the inlet to the first outlet conduit, a second outlet conduit in fluid communication with the cavity for delivering fuel to the burner system, the wall of the cavity defining a second flat surface surrounding the inlet to the second outlet conduit;

a first plate having a flat surface mounted for movement within the cavity such that the flat surface of the first plate engages the first flat surface surrounding the inlet to the first outlet conduit and is adapted to slide thereover, the first plate having an opening therethrough positioned to register with the inlet to the first outlet conduit for defining a first orifice of variable area which increases with movement of the first plate in a first direction and decreases with movement of the first plate in a second direction opposite to that of the first direction;

a second plate having a flat surface mounted for movement within the cavity such that the flat surface of the second plate engages the second flat surface surrounding the inlet to the second outlet conduit and is adapted to slide thereover, the second plate having an opening therethrough positioned to register with the inlet to the second outlet conduit for defining a second orifice of variable area which increases with movement of the second plate in the first direction and decreases with movement of the second plate in the second direction;

a differential pressure sensor connected to the housing for comparing a first pressure upstream of the first orifice and a second pressure downstream of the first orifice to measure the pressure drop thereacross, the pressure sensor being operatively connected to the first plate such that the first plate is moved in the first direction when the difference between the first and second pressures increases and in the second direction when the difference between the first and second pressures decreases;

means to operatively connect the first and second plates to produce a corresponding simultaneous movement of the second plate with movement of the first plate; and means to operatively disconnect the first and second plates to permit independent rotation of the first plate.

2. The combination of claim 1, wherein the differential pressure sensor comprises:

a bellows assembly mounted in the cavity such that its exterior is exposed to the first pressure, the interior of the bellows assembly being exposed to the second pressure; and further including:

means to bias the first plate into operative connection with the bellows assembly.

3. The combination of claim 1, further including:

means to mount the first and second plates for rotation within the cavity; and means urging the respective flat surfaces of the plates into engagement with the flat surfaces surrounding the inlets to the first and second outlet conduits.

4. The combination of claim 1, further including:

means to mount the first and second plates for rotation about a common axis.

5. The combination of claim 4, wherein the operatively connecting means comprises:

a projection on the first plate;

a set screw on the second plate adapted to engage the projection and permit adjustment of the relative angular positions of the first and second plates; and means to bias the second plate in the first direction to insure contact between the set screw and the projection; and wherein the operatively disconnecting means comprises:

a staging valve mounted in the housing and fluidly connected to the fuel control to displace the second plate in the second direction through an angle sufficient to close the second orifice.

* * * * *